United States Patent
Sari

(10) Patent No.: US 11,281,547 B2
(45) Date of Patent: Mar. 22, 2022

(54) REDUNDANT PROCESSOR ARCHITECTURE

(71) Applicant: ZF Friedrichshafen AG, Friedrichshafen (DE)

(72) Inventor: Bülent Sari, Friedrichshafen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 131 days.

(21) Appl. No.: 16/479,528

(22) PCT Filed: Dec. 21, 2017

(86) PCT No.: PCT/EP2017/083986
§ 371 (c)(1),
(2) Date: Jul. 19, 2019

(87) PCT Pub. No.: WO2018/134023
PCT Pub. Date: Jul. 26, 2018

(65) Prior Publication Data
US 2019/0361764 A1 Nov. 28, 2019

(30) Foreign Application Priority Data
Jan. 23, 2017 (DE) .......................... 102017201032.0

(51) Int. Cl.
*G06F 11/00* (2006.01)
*G06F 11/16* (2006.01)
(Continued)

(52) U.S. Cl.
CPC ...... *G06F 11/1629* (2013.01); *G06F 11/0724* (2013.01); *G06F 11/0751* (2013.01);
(Continued)

(58) Field of Classification Search
CPC ............ G06F 11/0751; G06F 11/0724; G06F 11/0793; G06F 11/14; G06F 11/142;
(Continued)

(56) References Cited

U.S. PATENT DOCUMENTS

| | | | | |
|---|---|---|---|---|
| 7,877,627 B1 * | 1/2011 | Freydel | ............... | G06F 11/1641 714/11 |
| 7,941,698 B1 * | 5/2011 | Aggarwal | ........... | G06F 11/1641 714/11 |

(Continued)

FOREIGN PATENT DOCUMENTS

| DE | 19631309 A1 | 2/1998 |
|---|---|---|
| DE | 102011086530 A1 | 5/2012 |

(Continued)

OTHER PUBLICATIONS

International Search Report from European Patent Office ISA in PCT/EP2017/083986 dated Apr. 26, 2018 (3 pages in English, 3 pages in German).

(Continued)

*Primary Examiner* — Anthony J Amoroso
(74) *Attorney, Agent, or Firm* — Crowell & Moring LLP

(57) ABSTRACT

The present disclosure relates to an assembly including a first processor having a first core, a second core and a controller, and a second processor having a first core, and wherein the first core and the second core of the first processor, and the first core of the second processor are configured to execute a first procedure. The controller of the first processor is configured to compare a first result from executing the first procedure on the first core of the first processor with a second result from executing the first procedure on the second core of the first processor; and comparing each of the first and second results with a third result from executing the first procedure on the first core of the second processor, if the first and second results differ from one another.

20 Claims, 1 Drawing Sheet

(51) Int. Cl.
   *G06F 11/07* (2006.01)
   *G06F 11/18* (2006.01)

(52) U.S. Cl.
   CPC ........ *G06F 11/0793* (2013.01); *G06F 11/165* (2013.01); *G06F 11/1641* (2013.01); *G06F 11/181* (2013.01); *G06F 11/184* (2013.01)

(58) Field of Classification Search
   CPC .. G06F 11/1428; G06F 11/16; G06F 11/1608; G06F 11/1629; G06F 11/1633; G06F 11/1637; G06F 11/1641; G06F 11/165; G06F 11/18; G06F 11/181; G06F 11/182; G06F 11/184
   See application file for complete search history.

(56) References Cited

U.S. PATENT DOCUMENTS

2003/0131197 A1    7/2003   Morrison
2007/0027603 A1*   2/2007   Katrak ................ G06F 11/1608
                                                              701/70
2007/0033511 A1*   2/2007   Davies ................. G06F 11/181
                                                              714/799
2009/0055674 A1    2/2009   Mueller et al.
2010/0138693 A1*   6/2010   Ohkawa .............. G06F 11/1695
                                                              714/25

FOREIGN PATENT DOCUMENTS

DE           2017201032 A1     5/2018
WO      WO 2014/207893 A1    12/2014
WO      WO-2014207893 A1 * 12/2014 ............ G06F 11/184
WO      WO 2018/134023 A1    7/2018

OTHER PUBLICATIONS

Office Action in DE 102017201032.0 dated Oct. 30, 2017 (14 pages).

Thompson H A et al., Transputer-based Fault Tolerant Strategies for a Gas Turbine Engine Controller, proceedings of the American Control Conference, San Diego, May 23-25, 1990, New York, IEEE, US, vol. 3, May 23, 1990 (6 pages).

Gray J. et al., High-availability Computer System, Computer, IEEE Computer Society, USA vol. 24, No. 9, Sep. 1, 1991 (10 pages).

* cited by examiner

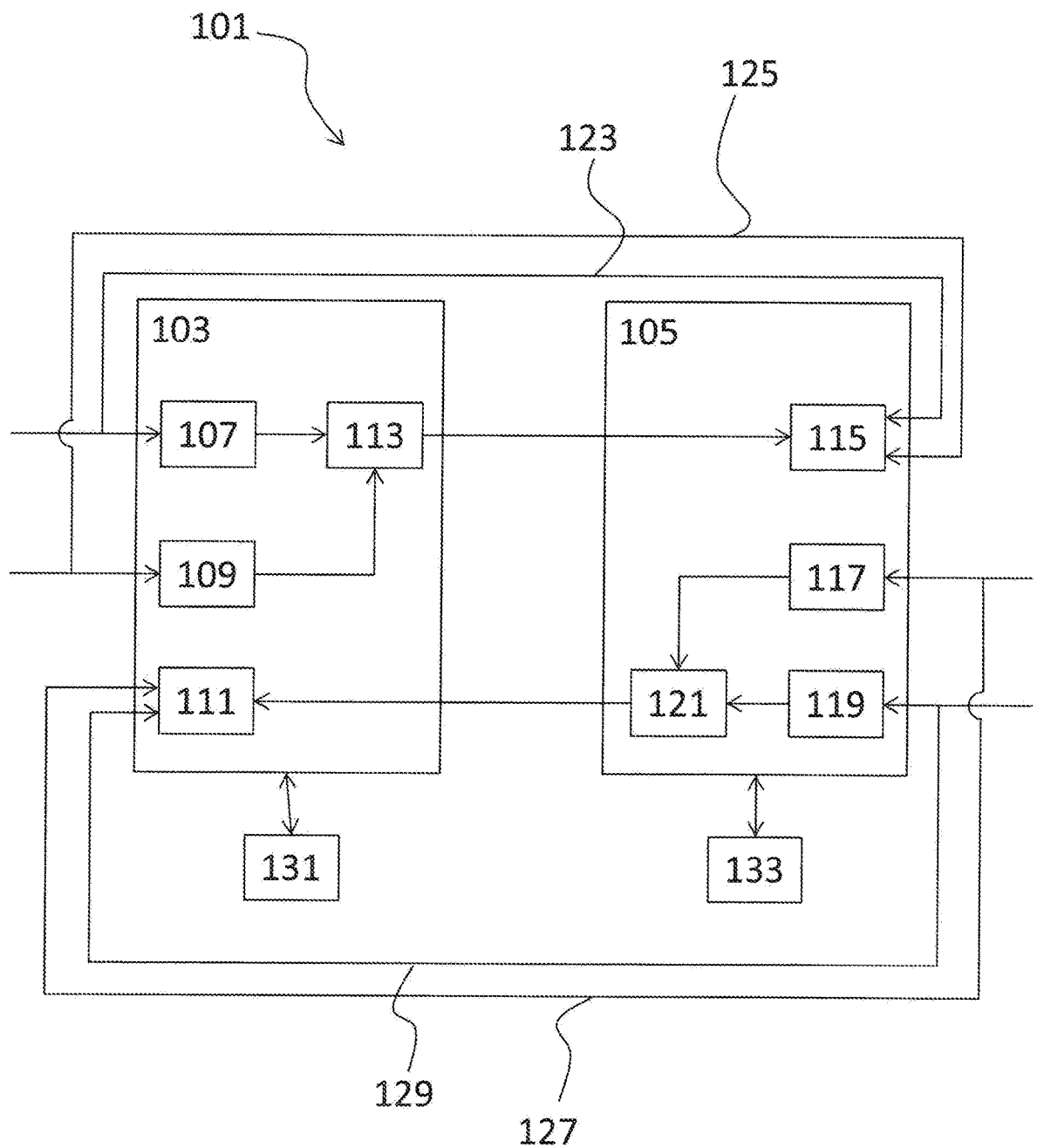

REDUNDANT PROCESSOR ARCHITECTURE

RELATED APPLICATIONS

This application is a filing under 35 U.S.C. § 371 of International Patent Application PCT/EP2017/083986, filed Dec. 21, 2017, claiming priority to German Patent Application 10 2017 201 032.0, filed Jan. 23, 2017. All applications listed in this paragraph are hereby incorporated by reference in their entireties.

TECHNICAL FIELD

The present disclosure relates to redundant processor architectures and associated methods.

BACKGROUND

Multiprocessor architectures known from the prior art are only suitable to a limited extent for fulfilling future requirements of autonomous vehicles. In particular, it is difficult to fulfill the requirements of the ISO 26262-1 standard when ASIL-D specifications are to be implemented.

A typical solution for implementing a reliable operating system is to monitor the components of the system, and deactivate them if there is an error. It is not possible, however, to deactivate components that execute safety functions. Systems with safety functions must be fault-tolerant and ensure that if there is an error, the safety functions can still be executed. Fault-tolerant systems known from the prior art are described in C. Temple and A. Vilela: "Fehlertolerante Systeme in Fahrzeugbau-von Fail Safe to Fail Operation," ["Fault-Tolerant Systems in Vehicle Design—From Fail Safe to Fail Operation"], Elektroniknet, July 2014.

SUMMARY

Disclosed is a fault-tolerant system that avoids the inherent disadvantages of the solutions known from the prior art. In particular, the availability of the system can be increased.

This object is achieved by example assemblies and/or methods, as well as additional developments, as are disclosed herein.

The assembly comprises a first processor and a second processor. A processor is an electronic circuit configured to read and execute one or more commands, i.e. a procedure.

A processor may contain components that are capable of executing one or more commands in and of themselves. These components are referred to as cores.

The first processor has at least a first core, a second core, and a controller. The second processor has at least a first core.

The first core and the second core of the first processor, as well as the first core of the second processor, are each configured to execute a first procedure. This means that the first procedure can be executed at least three times—on the first core and the second core of the first processor and on the first core of the second processor.

A controller can be in the form of a separate core, or it can be implemented in one of the aforementioned cores. It is defined as a means for executing steps for comparing results.

According to the present disclosure, the controller in the first processor is configured to execute the following steps:

comparing a result from executing the first procedure on the first core of the first processor with a result from executing the first procedure on the second core of the first processor; and comparing each of the results from executing the first procedure on the first core of the first processor and executing the first procedure on the second core of the first processor with a result from executing the first procedure on the first core of the second processor when the results from the execution of the first procedure on the first core and the second core of the first processor differ from one another.

The difference in the results from executing the first procedure on the first core and the second core of the first processor are determined by comparing the result from executing the first procedure on the first core of the first processor with the result from executing the first procedure on the second core of the first processor. The step for comparing each of the results from executing the first procedure on the first core of the first processor and executing the first procedure on the second core of the first processor with the result from executing the first procedure on the first core of the second processor implies that the first procedure is executed on the first core of the second processor.

The result from executing a procedure is understood in general to be an arbitrary value that correlates to the execution of the procedure. This can be the output value of a function if the procedure is in the form of a function.

A triple redundancy for executing the first procedure is obtained according to the present disclosure. If one of the three cores that execute the first procedure malfunctions or is defective, there are therefore two further cores available for a redundant execution. It is therefore not necessary to shut down the entire system.

In a development, the first core of the first processor is deactivated when the results from executing the first procedure on the first core and the second core of the first processor differ from one another, and the result from executing the first procedure on the second core of the first processor and the result from executing the first procedure on the first core of the second processor are the same. The second core of the first processor is deactivated according to the development, if the results from executing the first procedure on the first core and the second core of the first processor differ from one another, and the result from executing the first procedure on the first core of the first processor and the result from executing the first procedure on the first core of the second processor are the same. The difference in the results from executing the first procedure on the first core and the second core of the first processor indicates that there is a defect in the first core or the second core of the first processor. In this case, it is possible to identify the defective core of the first processor by comparing the results with the result from executing the first procedure on the first core of the second processor, and to then deactivate the defective core accordingly.

The assembly contains a second sensor in a preferred development. At least one signal of the first sensor is sent to both the first core of the first processor as well as the first core of the second processor. Accordingly, at least one signal of the second sensor is sent to the second core of the first processor and to the first core of the second processor. The signals preferably serve as input data for the first procedure executed on the respective processor. When the first core of the first processor or the second core of the first processor is deactivated due to an error, the corresponding sensor signal is available to the first core of the second processor according to the development. This enables the first core of the second processor to assume the duties of the deactivated processor core.

In a further preferred development, the first sensor and the second sensor are redundant. This means that the first sensor and the second sensor are configured to measure the same physical values.

The assembly is preferably symmetrical in a further development. This means that the first processor and the second processor have the same structure. In particular, the first processor and the second processor each have a first core, a second core, a third core, and a controller. The second core and the third core of the second processor, as well as the third core of the first processor are configured to execute a second procedure. The controller of the first processor is analogous to the controller of the second processor, which executes the following steps:

comparing the result from executing the second procedure on the second core of the second processor with a result from executing the second procedure on the third core of the second processor; and comparing each of the results from executing the second procedure on the second core of the second processor and from executing the second procedure on the third core of the second processor with a result from executing the second procedure on the third core of the first processor, when the results from executing the second procedure on the second core and the third core of the second processor differ from one another.

In a development, the second core of the second processor is deactivated, analogous to the deactivation of the first core and second core of the first processor, when the results from executing the second procedure on the second core and the third core of the second processor differ from one another, and the result from executing the second procedure on the third core of the second processor and the result from executing the second procedure on the third core of the first processor are the same. If the results from executing the second procedure on the second core and the third core of the second processor differ from one another, and the result from executing the second procedure on the second core of the second processor and the result from executing the second procedure on the third core of the first processor are the same.

The second processor receives input signals from a third sensor and a fourth sensor in a preferred development. At least one signal from the third sensor is sent to the second core of the second processor and the third core of the first processor. Accordingly, at least one signal is sent from the fourth sensor to the third core of the second processor and the third core of the first processor.

As with the first sensor and the second sensor, the third sensor and the fourth sensor are also redundant in a preferred development. The third sensor and the fourth sensor therefore measure the same physical values according to this development.

The assembly may form a component of a vehicle, e.g., a motor vehicle. In particular, the first processor can be a component of a transmission control device, and the second processor can be configured to control a power electronics unit. A vehicle that contains the assembly according to the present disclosure is able to reliably implement functions of driver assistance systems, or for autonomous driving.

A method according to the present disclosure can execute the following steps using the assembly according to the present disclosure or a development thereof:

executing the first procedure on the first core and the second core of the first processor;

comparing a result from executing the first procedure on the first core of the first processor with a result from executing the first procedure on the second core of the first processor;

comparing each of the results from executing the first procedure on the first core of the first processor and from executing the first procedure on the second core of the first processor with a result from executing the first procedure on the first core of the second processor, if the results from executing the first procedure on the first core and the second core of the first processor differ from one another.

This method can be further developed with method steps that can be executed by additional developments of the assembly according to the present disclosure, such as those described above.

BRIEF DESCRIPTION OF THE DRAWINGS

A preferred exemplary embodiment of the present disclosure is shown in FIG. 1. Identical reference numerals indicate identical or functionally identical features. Therein:

FIG. 1 shows a processor architecture.

DETAILED DESCRIPTION

A multiprocessor system 101 according to FIG. 1 contains a first processor 103 and a second processor 105. Both processors 103, 105 may contain numerous cores. The first processor 103 thus has a first core 107, a second core 109, a third core 111, and a controller 113. Accordingly, the second processor 105 has a first core 115, a second core 117, a third core 119, and a controller 121.

A first sensor signal 123 is sent to the first core 107 of the first processor 103 and to the first core 115 of the second processor 105. A second signal 125 is sent to the second core 109 of the first processor 103 and the first core 115 of the second processor 105. The first sensor signal 123 and the second sensor signal 125 are based on a redundant measurement of a single physical value by means of two different sensors.

Analogously, a third sensor signal 127 is sent to the second core 117 of the second processor and the third core 111 of the first processor 103. A redundant fourth signal 129 is sent to the third core 119 of the second processor 105 and the third core 11 of the first processor 103. Two redundant sensors that measure the same physical values generate the third sensor signal 127 and the fourth sensor signal 129.

The first core 107 and the second core 109 of the first processor, as well as the first core 115 of the second processor 105 are used to execute a first procedure with triple redundancy. The controller 113 of the first processor monitors the execution of the first procedure by the first core 107 and the second core 109 of the first processor 103 and compares the results. If these results are not the same, the controller 113 of the first processor draws on the first core 115 of the second processor 105 in order to determine whether the first core 107 or the second core 109 of the first processor 103 is defective. The defective core 107, 109 is deactivated. Consequently, there is still a double redundancy for executing the first procedure.

The execution of the second procedure by the second core 117 and the third core 119 of the second processor 105 and by the third core 111 of the first processor 103 is analogous to the execution of the first procedure described above.

There is a first watchdog 131 for monitoring the first processor 103. Accordingly, the second processor 105 is monitored by a second watchdog 133. The watchdogs 131, 133 allow for a complete failure of an individual processor 103, 105 to be prevented.

REFERENCE SYMBOLS 101 multiprocessor system
103 first processor
105 second processor
107 first core of the first processor
109 second core of the first processor
111 third core of the first processor
113 controller for the first processor
115 first core of the second processor
117 second core of the second processor
119 third core of the second processor
121 controller for the second processor
123 first signal
125 second signal
127 third signal
129 fourth signal
131 first watchdog
133 second watchdog

The invention claimed is:

1. An assembly comprising:
a first processor including a first core, a second core, and a controller;
a second processor including a first core;
a first sensor; and
a second sensor,
wherein at least one first signal is sent from the first sensor to the first core of the first processor and to the first core of the second processor, and
wherein at least one second signal is sent from the second sensor to the second core of the first processor and to the first core of the second processor;
wherein the first core of the first processor is configured to execute a first procedure using the at least one first signal from the first sensor, the second core of the first processor is configured to execute the first procedure using the at least one second signal from the second sensor, and the first core of the second processor is configured to execute the first procedure using at least one of the first signal from the first sensor or the second signal from the second sensor; and
wherein the controller of the first processor is configured to:
compare a first result from executing the first procedure on the first core of the first processor with a second result from executing the first procedure on the second core of the first processor;
determine that the first result and the second result differ from one another; and
in response to determining that the first result and the second result differ from one another, compare each of the first result and the second result with a third result from executing the first procedure on the first core of the second processor.

2. The assembly according to claim 1,
wherein the first core of the first processor is configured to be deactivated if the first result and the second result differ from one another, and if the second result and the third result are the same, and
wherein the second core of the first processor is configured to be deactivated if the first result and the second result differ from one another, and if the first result and the third result are the same.

3. The assembly according to claim 2, wherein the first core of the second processor is configured to:
assume a duty of the first core of the first processor using the at least one first signal from the first sensor in response to the first core of the first processor being deactivated; and
assume a duty of the second core of the first processor using the at least one second signal from the second sensor in response to the second core of the first processor being deactivated.

4. The assembly according to claim 1, wherein the first sensor and the second sensor are configured to measure a same physical value.

5. The assembly according to claim 1,
wherein the first processor includes a third core,
wherein the second processor includes a second core, a third core, and a controller,
wherein the second core and the third core of the second processor and the third core of the first processor are configured to execute a second procedure, and
wherein the controller of the second processor is configured to:
compare a fourth result from executing the second procedure on the second core of the second processor with a fifth result from executing the second procedure on the third core of the second processor;
determine that the fourth result and the fifth result differ from one another; and
in response to determining that the fourth result and the fifth result differ from one another, compare each of the fourth result and the fifth result with a sixth result from executing the second procedure on the third core of the first processor.

6. The assembly according to claim 5,
wherein the second core of the second processor is configured to be deactivated if the fourth result and the fifth result differ from one another, and if the fifth result and the sixth result are the same, and
wherein the third core of the second processor is configured to be deactivated if the fourth result and the fifth result differ from one another, and if the fourth result and the sixth result are the same.

7. The assembly according to claim 5, further comprising:
a third sensor; and
a fourth sensor,
wherein at least one signal is sent from the third sensor to the second core of the second processor and to the third core of the first processor, and
wherein at least one signal is sent from the fourth sensor to the third core of the second processor and to the third core of the first processor.

8. The assembly according to claim 7, wherein the third sensor and the fourth sensor are configured to measure a same physical value.

9. A vehicle comprising the assembly according to claim 1.

10. A method comprising:
executing a first procedure on a first core and a second core of a first processor, and on a first core of a second processor;
receiving, by the first core of the first processor and the first core of the second processor, a first sensor signal sent from a first sensor, the first sensor signal for use in executing the first procedure by the first core of the first processor and the first core of the second processor;
receiving, by the second core of the first processor and the first core of the second processor, a second sensor signal sent from a second sensor, the second sensor signal for use in executing the first procedure by the second core of the first processor and the first core of the second processor;

comparing, by a controller of the first processor, a first result from executing the first procedure on the first core of the first processor with a second result from executing the first procedure on the second core of the first processor;

determining, by the controller of the first processor, that the first result and the second result differ from one another; and in response to determining that the first result and the second result differ from one another, comparing, by the controller of the first processor, each of the first result and the second result with a third result from executing the first procedure on the first core of the second processor.

11. The method according to claim 10, further comprising:

determining, by the controller of the first processor, that the second result and the third result are the same; and deactivating the first core of the first processor in response to determining that the second result and the third result are the same.

12. The method according to claim 11, further comprising:

assuming, by the first core of the second processor, a duty of the first core of the first processor using the first sensor signal from the first sensor in response to the first core of the first processor being deactivated.

13. The method according to claim 10, further comprising:

determining, by the controller of the first processor, that the first result and the third result are the same; and deactivating the second core of the first processor in response to determining that the first result and the third result are the same.

14. The method according to claim 13, further comprising:

assuming, by the first core of the second processor, a duty of the second core of the first processor using the second sensor signal from the second sensor in response to the second core of the first processor being deactivated.

15. The method according to claim 10, further comprising:

measuring a same physical value by the first sensor and the second sensor.

16. The method according to claim 10, further comprising:

executing a second procedure on a third core of the first processor, and on a second core and a third core of the second processor;

comparing, by a controller of the second processor, a fourth result from executing the second procedure on the second core of the second processor with a fifth result from executing the second procedure on the third core of the second processor;

determining, by the controller of the second processor, that the fourth result and the fifth result differ from one another; and in response to determining that the fourth result and the fifth result differ from one another, comparing each of the fourth result and the fifth result with a sixth result from executing the second procedure on the third core of the first processor.

17. The method according to claim 16, further comprising:

determining, by the controller of the second processor, that the fifth result and the sixth result are the same; and deactivating the second core of the second processor in response to determining that the fifth result and the sixth result are the same.

18. The method according to claim 16, further comprising:

determining, by the controller of the second processor, that the fourth result and the sixth result are the same; and deactivating the third core of the second processor in response to determining that the fourth result and the sixth result are the same.

19. The method according to claim 16, further comprising:

receiving, by the second core of the second processor and the third core of the first processor, a third sensor signal sent from a third sensor, the third sensor signal for use in executing the second procedure by the second core of the second processor and the third core of the first processor; and receiving, by the third core of the second processor and the third core of the first processor, a fourth sensor signal sent from a fourth sensor, the fourth sensor signal for use in executing the second procedure by the third core of the second processor and the third core of the first processor.

20. The method according to claim 19, further comprising:

measuring a same physical value by the third sensor and the fourth sensor.

* * * * *